United States Patent [19]

Jacobson

[11] 4,143,727
[45] Mar. 13, 1979

[54] LEVERLESS SCALE SENSOR

[75] Inventor: Walter E. Jacobson, Meriden, Conn.

[73] Assignee: Revere Corporation of America, Wallingford, Conn.

[21] Appl. No.: 782,714

[22] Filed: Mar. 30, 1977

[51] Int. Cl.² .................. G01G 3/14; G01G 3/08; G01L 5/12
[52] U.S. Cl. .................. 177/211; 177/229; 73/141 A
[58] Field of Search ......... 177/211, 229, 255, DIG. 3; 73/141 A

[56] References Cited

U.S. PATENT DOCUMENTS

| | | | |
|---|---|---|---|
| 3,161,046 | 12/1964 | Farley | 73/141 A |
| 3,184,964 | 5/1965 | Hedrick et al. | 73/141 A |
| 3,222,628 | 12/1965 | Pien | 73/141 A X |
| 3,240,281 | 3/1966 | Schaevitz | 177/229 X |
| 3,495,669 | 2/1970 | Yeager et al. | 177/211 X |
| 3,788,411 | 1/1974 | Oxley | 177/211 |
| 3,805,604 | 4/1974 | Ormond | 177/211 X |
| 3,994,161 | 11/1976 | Trozera | 177/211 X |
| 4,020,686 | 5/1977 | Brendel | 73/141 A |
| 4,036,316 | 7/1977 | Rock | 177/DIG. 3 |

Primary Examiner—George H. Miller, Jr.
Attorney, Agent, or Firm—Cooper, Dunham, Clark, Griffin & Moran

[57] ABSTRACT

This weighing scale has a platform, a load cell supporting the platform and a base supporting the load cell. The load cell utilizes electrical strain gage elements, which are connected in an electrical circuit controlling an indicator. The scale is constructed to be unaffected by the eccentricity of the load on the platform. The scale is particularly suited for use in retail or other establishments, where loads are placed on the platform casually and rapidly, so that eccentric loading is common. The load cell comprises an integral block of material divided by four transversely bored holes and two horizontal slots into two relatively rigid vertical members and three relatively flexible horizontal members connecting the vertical members. The platform is supported on one of the vertical members. The base is connected to the other vertical member. The upper and lower horizontal members transfer all bending moments due to eccentric loads from one vertical member to the other. The middle horizontal member is constructed so that it is stressed substantially only by the vertical component of the load. The strain gage elements are on this middle horizontal member and thus measure only the vertical load.

3 Claims, 13 Drawing Figures

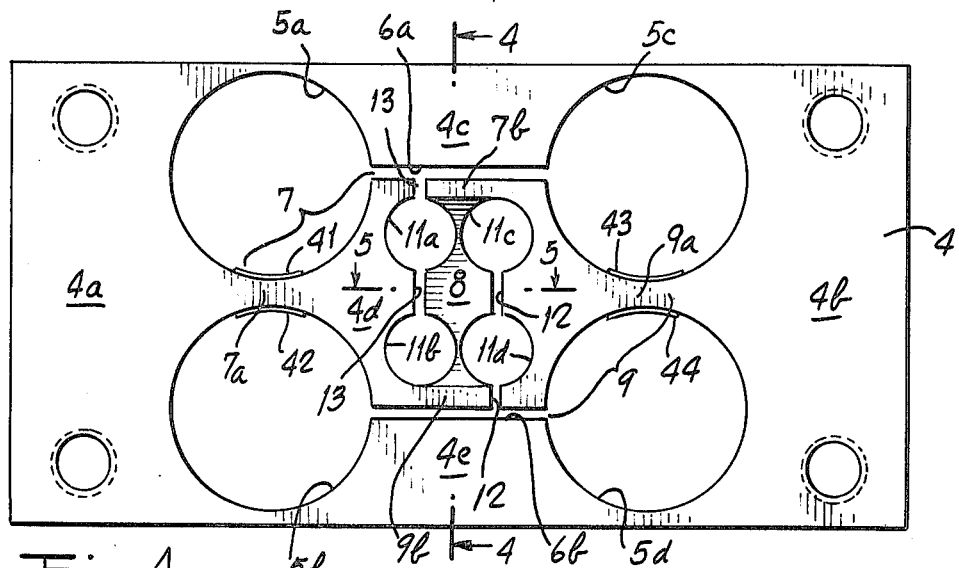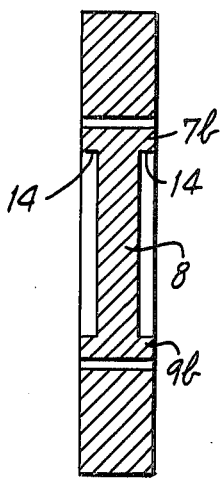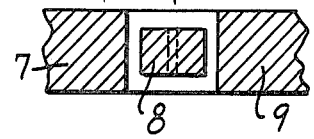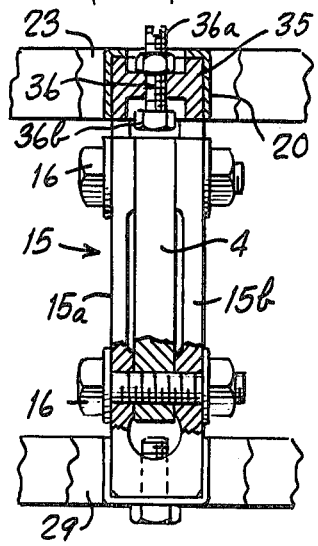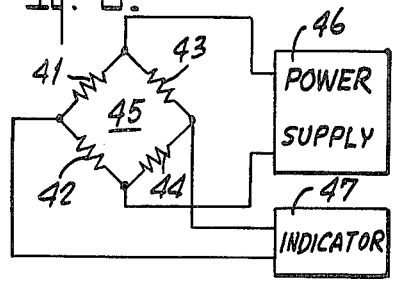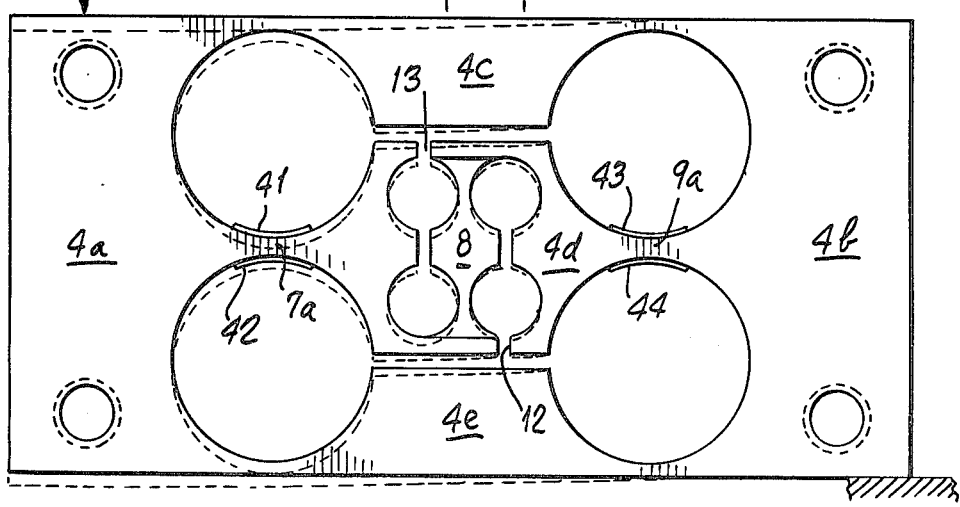

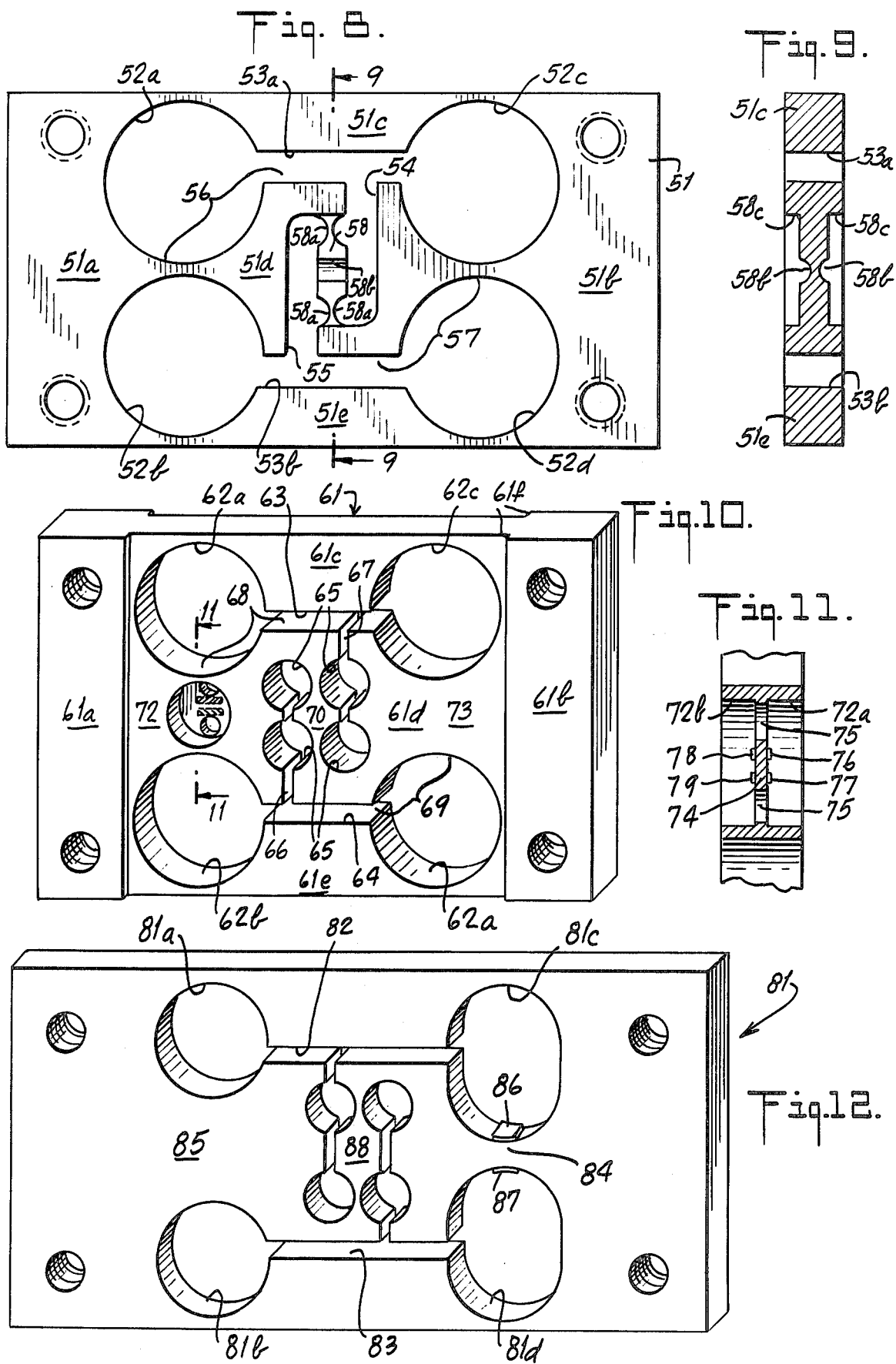

LEVERLESS SCALE SENSOR

SUMMARY OF THE INVENTION

The invention is particularly concerned with the load cell structure, by which the scale is made insensitive to eccentric loads on the weighing platform. This load cell structure is of general utility in other load cell applications where insensitivity to eccentric loads is desirable.

The load cell comprises an integral block having a first set of four transverse holes bored therethrough in two vertically aligned pairs. The upper holes of each pair are connected by a horizontal slot and the lower holes of each pair are similarly connected. Thus, the load cell is divided by the four holes and the slots into two vertical members and three horizontal members.

The middle one of the three members is constructed so that it does not transmit bending moments from one vertical member to the other. This middle member includes two vertically narrow neck sections adjacent its ends and a vertically wider middle section. A second set of four holes is bored transversely through the middle section. A vertical slot extends downwardly from the upper horizontal slot and connects one vertical pair of holes. Another vertical slot extends upwardly from the lower horizontal slot through the other vertical pair of these holes. There are thus created two flexible beam elements extending inwardly from the two vertical members. The inner ends of those elements are vertically aligned and are connected by a flexure element having narrow neck portions adjacent its upper and lower ends. The flexure element bends easily in response to horizontal forces applied at its ends, and does not transmit such forces. It does transmit vertical forces from one beam element to the other. The flexible elements are thus stressed only by the vertical forces applied to the load cell and are not stressed by moments due to eccentric loads of the platform. The strain gages are placed on the flexible elements and measure only the weight of the load, being unaffected by the eccentricity of its position.

DRAWINGS

FIG. 1A is a right-hand elevation of the scale of FIG. 1, with some parts broken away and others shown in section on the line 1A—1A of FIG. 1.

FIG. 3 is an elevational view, on an enlarged scale, of an integral block employed in the load cell of FIG. 1, with most other parts removed.

FIG. 4 is a sectional view taken on the line 4—4 of FIG. 3.

FIG. 5 is a sectional view taken on the line 5—5 of FIG. 3.

FIG. 6 is a wiring diagram showing strain gage elements of the scale and the circuit controlled thereby.

FIG. 7 is a view of the load cell block of FIG. 3, with dotted lines added to show the distortion of the block under load.

FIG. 8 is an elevational view similar to FIG. 3, showing a modification.

FIG. 9 is a sectional view taken on the line 9—9 of FIG. 8.

FIG. 10 is a perspective view showing a modified form of load cell block.

FIG. 11 is a sectional view taken on the line 11—11 of FIG. 10.

FIG. 12 is a perspective view similar to FIG. 10, showing another modification.

DETAILED DESCRIPTION

FIGS. 1-6

Figure 1:
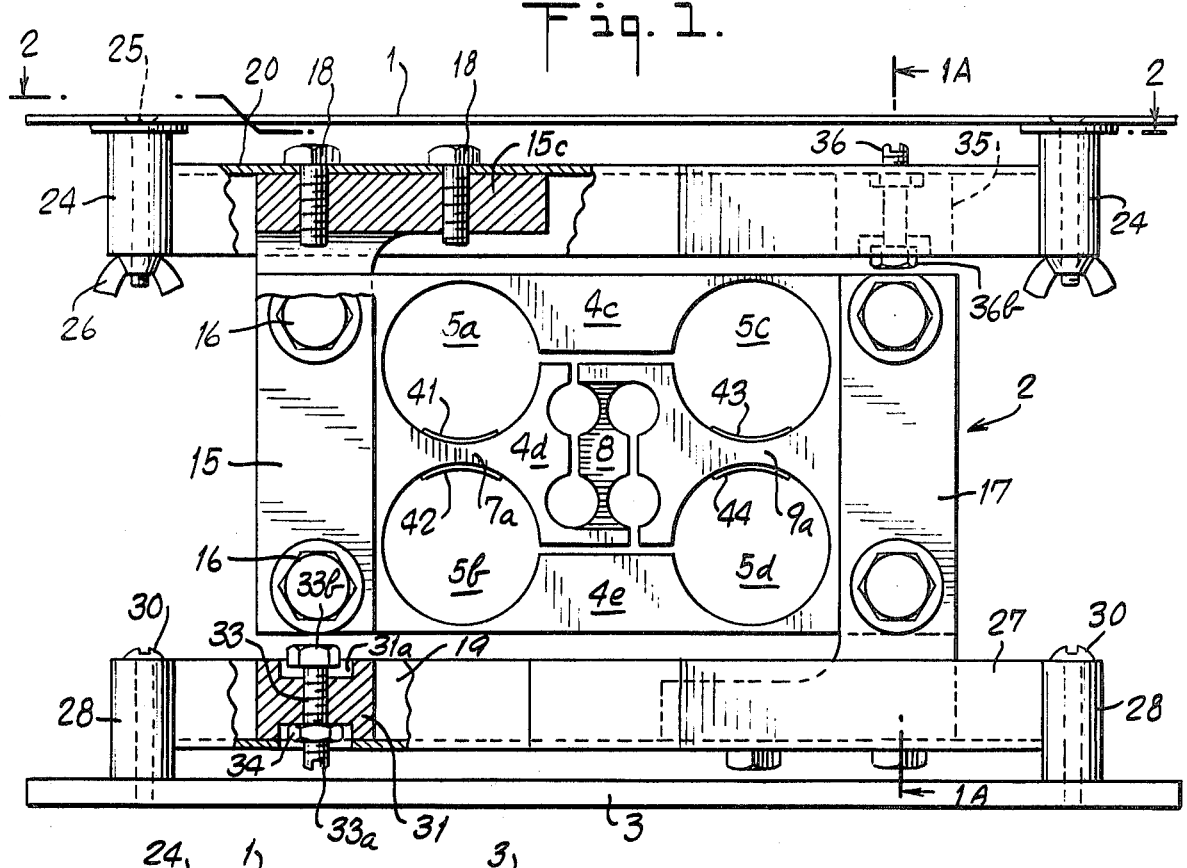
FIG. 1 is an elevational view of a weighing scale, embodying the invention, with certain parts broken away and others shown in section.

These figures illustrate a scale including a platform 1 supported on a load cell 2, which is in turn supported on a fixed base 3. The load cell 2 comprises an integral block 4 of elastic material, usually metal, having a rectangular contour as viewed in front elevation, and shown in FIG. 3 separated from other parts of the scale. A set of four holes 5a, 5b, 5c and 5d is bored through the block from front to back, as viewed in FIGS. 1 and 3. The holes 5a and 5b constitute a first vertical pair, and the holes 5c and 5d constitute a second vertical pair. Each vertical pair of holes has its axes aligned in a vertical plane. An upper slot 6a (see FIG. 3) is cut through the block 4 and connects the upper holes 5a and 5c. A lower slot 6b is cut through the block and connects the lower holes 5b and 5d. The holes 5a, 5b, 5c, 5d and the slots 6a and 6b divide the block into two relatively rigid vertical members 4a and 4b and three relatively flexible horizontal members 4c, 4d and 4e.

The middle flexible horizontal member 4d comprises a flexible beam element 7, a flexure element 8, which is strained as a column, and a flexible beam element 9. The flexible member 4d is divided into the flexible beam elements 7 and 9 and the flexure element 8 by a set of four holes 11a, 11b, 11c and 11d. A slot 12 extends upwardly from the slot 6b through the hole 11d and opens into the hole 11c. Another slot 13 extends from the slot 6a downwardly through the hole 11a and opens into the hole 11b.

The front and rear faces of the flexure 8 are recessed, as shown at 14 FIG. 4, so that the flexure 8 has the cross-sectional configuration of an I-beam.

The flexible element 7 comprises a narrow neck portion 7a between the holes 5a and 5b, which is integral at its left end, as viewed in FIG. 3, with the vertical member 4a and extends to the right from the narrow neck portion 7a to an extension 7b integral with the top of the flexure 8. Similarly, the flexible beam element 9 comprises a narrow neck portion 9a integral at its right-hand end with the middle of the vertical member 4b and extends from the neck 9a toward the left to an extension 9b integral with the bottom of the flexure 8.

The vertical members 4a and 4b and the upper and lower horizontal members 4c and 4e may be described as a frame enclosing the middle horizontal member 4d, which constitutes a fifth member of the load cell block.

All of the members 4a, 4b, 4c and 4e have a common relatively short dimension perpendicular to the plane of the paper in FIGS. 1 and 3 and appearing as the horizontal dimension in FIG. 4. The direction of this short dimension is perpendicular to the direction of elongation of the vertical members 4a and 4b and is also perpendicular to the direction of elongation of the horizontal members 4c, 4d and 4e. Thus, the block 4 may be described as planar and rectangular.

A bracket 15 (FIG. 1) has a pair of clevis arms 15a, 15b, attached to the front and back of the vertical member 4a by means of bolts 16. The clevis arms extend above the load cell block 4 and are connected to a horizontal arm 15c which is attached by means of screws 18 to a beam 20 having an inverted channel-shaped cross-section. A spider 21 includes a pair of side plates 22 and a pair of end plates 23. Each side plate is attached at its middle portion, as by welding, to one flange of the beam 20 and its end portions diverge from that beam. The ends of the side plates 22 are connected, as by welding, to couplings 24, which are also attached to the ends of the end plates 23. Screws 25 extend through the platform 1 and through the couplings 24. Wing nuts 26 cooperate with screws 25 to hold the platform in place on the spider 21.

The load cell 2 is supported on the base 3 by a generally similar supporting structure, not shown in detail, including a bracket 17, a channel-shaped beam 19, side plates 27, couplings 28, end plates 29, and screws 30. The screws 30 are threaded into the base 3.

A block 31 is fastened in channel-shaped beam 19. A screw 33 having a slotted end 33a at its lower end and a hexagonal head 33b at its upper end is threaded through the block 31. It may be adjusted vertically and locked in place at any position in block 31 by means of a jam nut 34. The block 31 is provided with a recess 31a in its upper surface, which recess may receive part of the head 33b. The screw 33 serves as an overload stop to limit the downward movement of the vertical member 4a of the load cell. A similar overload stop is provided in the channel-shaped beam 20. That stop includes a block 35 and a screw 36 having a projecting hexagonal head 36b, and serves to limit the downward movement of the platform with respect to vertical member 4b. Strain gage elements 41 and 42 are placed on the upper and section 7a. Similar strain gage elements sides, respectively, of the narrow neck section 7a. Similar strain gage elements 43 and 44 are placed on the upper and lower sides of the narrow neck section 9a. When a load is placed on the scale, the strain gage elements 41 and 44 are subjected to compressive strains and the elements 42 and 43 are subjected to tensile strains. These strain gage elements are connected in a bridge circuit 45 (FIG. 6) connected to a power supply 46 and having output terminals connected to an indicator 47, which may alternatively be a recorder.

Considering first the condition where the center line of the load is aligned vertically with the center of the vertical member 4a, the frame 4a, 4b, 4c, 4e deflects in a fashion similar to a parallelogram linkage, so that the members 4a and 4b remain vertical, but the member 4a moves lateraly toward the member 4b. Member 4c is strained in tension and member 4e in compression. Any movement due to the load is resisted by the flexible members 4c and 4e. The moments acting at the opposite ends of the member 8 are substantially equal and opposite and therefore balanced. Any moment transmitted through the middle flexible member 4d is too small to be significant. Under ideal conditions, the member 8 remains vertical. The member 8 is so flexible at its narrow neck portions between the holes 11a and 11c and between the holes 11d and 11b that it bends easily in lateral directions, and no moment is transmitted through it. Hence, the only strain in the member 4d is due to the weight of the load, and the strain gage elements 41, 42, 43 and 44 accurately measure that load, which measurement appears at the indicator 47.

Under such loading conditions, both the slots 12 and 13 are slightly narrowed when the load is applied.

Figure 2:
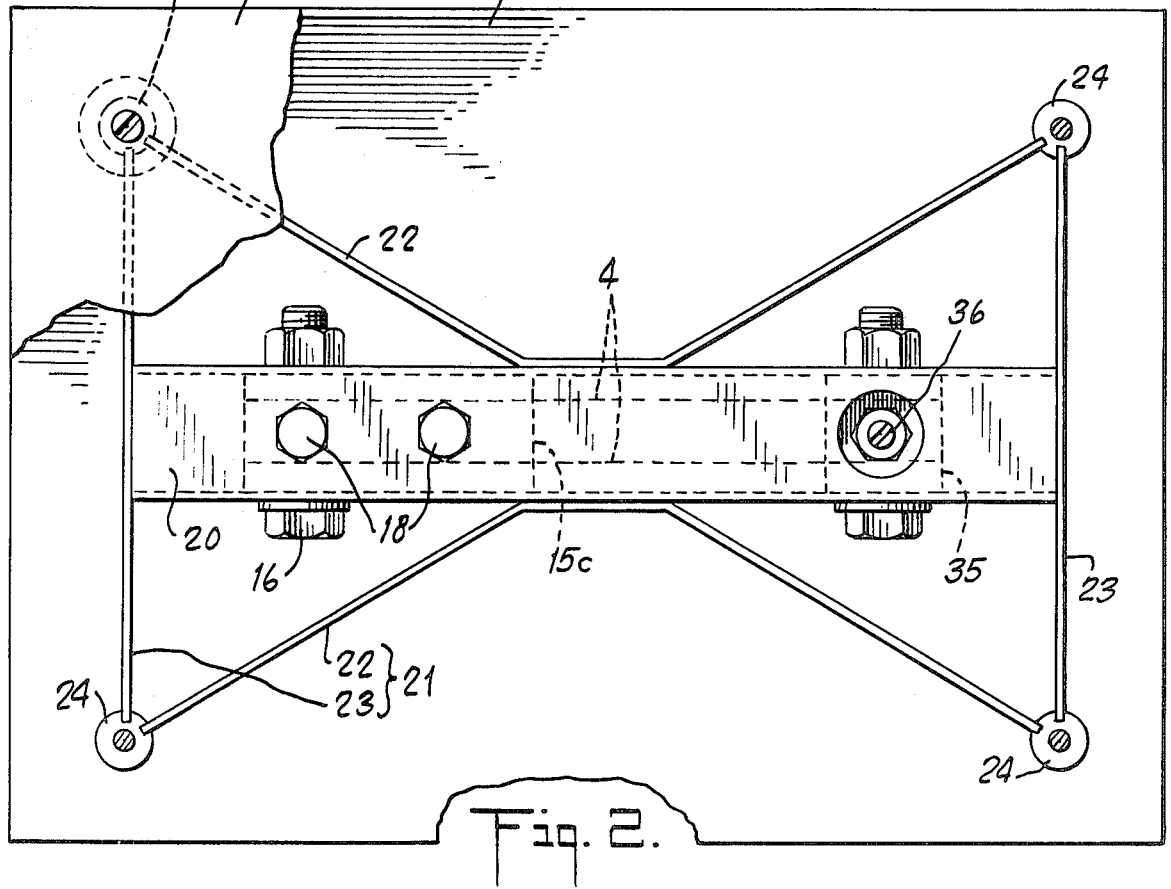
FIG. 2 is a plan view of the weighing scale of FIG. 1, with most of the platform broken away.

Consider now the situation where the load is not aligned with the vertical member 4a. Take, for example, the condition where the center of the load is at the middle of the left-hand edge of the platform 1, as viewed in FIG. 2. The load then applies a counterclockwise moment to the top of vertical member 4a, as viewed in FIG. 3, which tends to strain the flexible member 4c in tension and to strain the flexible member 4e in compression. If the center of the load is moved to the right in FIG. 2 along the horizontal center line of the platform 1, then as it passes over the vertical member 4a, the direction of the moment changes from counterclockwise to clockwise. As the load moves farther to the right, the moment increasingly strains the flexible member 4c in compression and the member 4e in tension. Thus, under some load conditions, the directions of the strains in the members 4c and 4e may be opposite from the strains under some other load conditions.

Depending upon the eccentricity of the load, the slots 12 and 13 may be both narrowed or both widened or one might be narrowed and the other widened. The flexure 8 always remains substantially vertical, although it typically departs slightly from the vertical under most load conditions.

If the load on the platform 1 is eccentric, there will be transmitted to the vertical member 4a both a downward force, which is a measure of the load, and a moment whose direction depends upon the displacement of the center of gravity of the load with respect to the center of the platform. The moment tends to twist the block 4 by moving the upper end of the vertical member 4a laterally with respect to its lower end. This moment may act either perpendicular to the plane of the paper or parallel to the plane of the paper. Components acting in both of those directions may be, and usually will be, present in the moment in any particular eccentric load situation.

If there is a moment perpendicular to the plane of the paper, the upper flexible member 4c and the lower flexible member 4e both resist that moment, and are strained by it. However, in the middle flexible member 4d, the flexure 8 is easily bent by that moment, without being greatly strained. This ease of bending in this direction is facilitated by the recesses 14 (FIG. 4), which allow the flexure 8 to bend more easily than the wider extensions 7b, 9b with which it is integrally connected. Before the flexure 8 bends far enough to be significantly strained, the member 4c and 4e develop sufficient stress to resist the moment. Substantially all the moment is carried by the members 4c and 4e and none by the fifth member 4d.

Similarly, as to moments parallel to the plane of the paper, the middle member 4d does not resist compressive or tensile forces applied through the narrow neck sections 7a and 9a. Instead, the flexure 8 simply bends at its narrow neck sections as required to accommodate the forces applied at the ends of the flexible member 4d, without transmitting substantial strain through that member.

As to any moment or combination of moment components, the strain gage elements 41, 42, 43 and 44, being located on the flexible member 4d, are not strained by moments, but only by the vertical forces applied to the platform 1. Hence, the unbalance of the bridge circuit 45 depends only on the weight of the load placed on the platform 1, and that weight is reflected in the indicator 47, without distortion due to any moment caused by eccentric loading.

FIGS. 8–9

These figures illustrate a modified form of integral block 51 for use in a load cell such as employed in FIG. 1. Four holes 52a, 52b, 52c, and 52d are made through the block 51. The holes 52a and 52c are connected by an upper slot 53a. The holes 52b and 52d are connected by a lower slot 53b. The holes 52a, 52b, 52c and 52d and the slots 53a and 53b divide the block 51 into two relatively rigid vertical members 51a and 51b and three relatively flexible horizontal members 51c, 51d and 51e. A slot 54 extends downwardly from the slot 53a, extending almost all the way through the flexible member 51d. A similar slot 55 extends upwardly from the slot 53b almost all the way through the member 51d. The slots 54 and 55 separate the flexible member 51d into two flexible beam elements 56 and 57 separated by a vertical flexure element 58. The flexure 58 is notched in its upper and lower ends, as shown at 58a in FIG. 8. The notches 58a increase the flexibility of the flexure 8 in response to moments parallel to the plane of the paper, as viewed in FIG. 8. The flexure 58 is also notched on its front and back faces, as shown at 58b (FIG. 9). The faces of the flexure 58 are recessed as shown at 58c. The recesses 58c and notches 58b increase the flexibility of the flexure 58 in response to moments perpendicular to the plane of the paper, as viewed in FIG. 8.

Notches such as those shown at 58b may be employed, if desired, on any of the other modifications illustrated.

The operation of the load cell block 51 is similar to that of the block 4 as described in connection with FIGS. 1 to 7.

FIGS. 10–11

These figures illustrate a modified form of load cell block which may be used in the weighing scale of FIGS. 1 to 6 in substitution for the block 4.

The block 61 has a configuration which appears rectangular in elevation. Four holes 62a, 62b, 62c and 62d are bored through the block. The holes 62a and 62c are connected by a slot 63. The slots 62b and 62d are connected by a slot 64. The holes 62a, 62b, 62c, 62d and the slots 63 and 64 divide the block 61 into two relatively rigid vertical members 61a and 61b and three relatively flexible horizontal members 61c, 61d and 61e. Member 61d is provided with four holes 65. The two left-hand holes 65 are connected by a slot 66 which extends upwardly from the slot 64. The two right-hand holes 65 are connected by a slot 67 which extends downwardly from slot 63. The holes 65 and the slots 66 and 67 divided the middle member 61b into a pair of flexible beam elements 68 and 69 and a vertical flexure 70. The flexible beam element 68 extends from the vertical rigid member 61a through a narrow neck section 72 to an integral connection with the top of the flexure 70. The flexible beam member 69 extends from vertical member 61b through a narrow neck section 73 to an integral connection with the bottom of the flexure 70. The narrow neck section 72 and 73 are considerably wider in the vertical direction than the narrow neck sections 7a and 9a of FIG. 3. The narrow neck section 72 is provided on its opposite faces with a pair of recesses 72a, 72b (see FIG. 11), leaving a thin web 74 across the middle of the narrow neck section 72. A pair of holes 75 are bored through a thin web 74, leaving only a narrow bridging portion extending horizontally across the middle of the web 74. Strain gage elements 76, 77, 78 and 79 are affixed to the opposite faces of the bridging portion of the web 74. The upper and lower strain gage elements 76 and 77 are slanted at 45° to the horizontal and in mutually perpendicular directions. The other two strain gage elements 78 and 79 are similarly oriented, except that gage element 78 is oriented perpendicularly to its immediately opposite strain gage 76. These strain gage elements 76, 77, 78 and 79 measure shear strains rather than compression and tension strains.

The front and rear faces of the block 61 between the vertical members 61a and 61b are recessed, as shown at 61f, so that the middle part of the block is thinner than the vertical members 61a and 61b. This configuration makes the recessed parts of the block more highly stressed in response to a given load, and hence the strain gage elements 76, 77, 78 and 79 are more sensitive.

FIG. 12

This figure illustrates a further modified form of load cell block, generally indicated at 81. The block is provided with four holes 81a, 81b, 81c and 81d. The holes 81a and 81c are connected by a slot 82. The holes 81b and 81d are connected by a slot 83. The holes 81 and the slots 82 and 83 divide the block into two vertical members and three horizontal members, as in the case of the other species. The holes 81c and 81d have considerably larger vertical dimensions than the holes 81a and 81b, so that a narrow neck section 84 between the holes 81c and 81d is substantially narrower than the neck section 85 between the holes 81a and 81b. Strain gage elements 86 and 87 are placed only on the narrow neck section 84 which is more highly strained than the thicker neck section 85 and hence more sensitive. This arrangement of the wide and narrow neck sections makes the cell block as a whole stiffer (because of the wider neck section 85) without loss of sensitivity (because the strain gage elements are placed on the narrow neck section 84).

The other parts of the structure of the load cell block 81 correspond to those of the block 4, and need not be further described. Note that the left-hand pair of inner holes is cut through by a vertical slot branching from the upper horizontal slot in FIGS. 1–7 and 12, and by a vertical slot branching from the lower horizontal slot in FIGS. 8 and 9. On the other hand, the right-hand pair of inner holes is cut through by a vertical slot branching from the lower horizontal slot in FIGS. 1–7 and 12 and by a vertical slot branching from the upper horizontal slot in FIGS. 8 and 9. In the structures shown in FIGS. 1–7 and 12, the central flexure 8 or 88 is stressed in tension by a load on the platform 1, while in the structures shown in FIGS. 8 and 9, the central flexures 58 and 70 are strained in compression. For use in a weighing scale, the modifications where the central flexure is strained in tension are preferred. However, all the load cells shown are universal in the sense that they will accept and measure either compression loads or tension loads.

I claim:

1. A load cell for converting variations in a force into variations in a force into variations in an electrical condition, comprising:
    a. a pair of spaced, relatively rigid, parallel members extending in the direction of a force to be measured;
    b. a pair of spaced, relatively flexible, parallel members extending between the relatively rigid members at right angles thereto and connected only thereto;

c. a fifth member extending between the relatively rigid members at right angles thereto and connected only thereto, said fifth member being located between and spaced from said flexible members and comprising:
  1. two flexible elements, respectively fixed at one end to respective ones of said pair of relatively rigid members and having their opposite ends extending therefrom toward the other of said pair of relatively rigid members, said opposite ends being spaced and aligned in said direction; and
  2. a flexure element connected between said opposite ends of said two flexible elements and extending in said direction, said flexure element being stressed longitudinally by said force and having four semicylindrical notches, one on each of its side faces adjacent each end thereof, said notches making said element laterally flexible in response to forces perpendicular to said force to be measured so that substantially only a force parallel to said force to be measured is transmitted through said fifth member; and d. electrical strain responsive means on at least one of the flexible elements for converting strain variations therein to variations in an electrical condition which measures said force and is unaffected by moments due to eccentric application of said force to one of said rigid members.

2. A load cell as in claim 1, including transversely extending semicylindrical notches on the opposite recessed faces of the flexure element at the middle thereof.

3. A load cell as in claim 1, including:
a. a pair of aligned recesses in opposite faces of a narrow neck of said one flexible element, leaving a thin web of material between said aligned recesses;
b. a pair of holes having their centers aligned along a line parallel to the force being measured and extending through said web and leaving a narrow bridging portion thereof; and
c. said strain responsive means includes strain gage elements located on said narrow bridging portion of the web.

* * * * *

UNITED STATES PATENT AND TRADEMARK OFFICE
CERTIFICATE OF CORRECTION

PATENT NO. : 4,143,727
DATED : March 13, 1979
INVENTOR(S) : Walter E. Jacobson

It is certified that error appears in the above-identified patent and that said Letters Patent are hereby corrected as shown below:

Col. 2, line 46, delete "7b" and change "top" to -- bottom --;
       line 51, delete "9b" and change "bottom" to -- top --.

Col. 3, line 33, after "and" insert -- lower sides, respectively, of the narrow neck --.

Col. 4, line 47, "member" should read -- members --.

Col. 6, line 62, delete "variations in a force into".

Col. 8, lines 9-12, after "claim 1," delete the remainder of the claim and insert the following: -- in which:
  a. the opposite faces of the flexure element are recessed from the adjacent faces of the flexible elements, and said opposite recessed faces are provided with transversely extending semicylindrical notches at the middle of said flexure element. --

Column 3, lines 33 & 34, delete "section 7a. Similar strain gage elements sides, respectively of the narrow neck"

Signed and Sealed this

Twenty-first Day of August 1979

[SEAL]

Attest:

LUTRELLE F. PARKER

Attesting Officer    Acting Commissioner of Patents and Trademarks